United States Patent [19]

Offer

[11] Patent Number: 5,649,355
[45] Date of Patent: Jul. 22, 1997

[54] WELDING ELECTRODE WITH FLAT BLADE AND RELATED METHOD OF MANUFACTURE

[75] Inventor: Henry Peter Offer, Los Gatos, Calif.

[73] Assignee: General Electric Company, San Jose, Calif.

[21] Appl. No.: 607,032

[22] Filed: Feb. 26, 1996

Related U.S. Application Data

[62] Division of Ser. No. 237,732, May 4, 1994, Pat. No. 5,527,441.

[51] Int. Cl.⁶ ........................................ H01R 43/00
[52] U.S. Cl. ............... 29/825; 204/224 R; 204/279; 204/280; 204/286; 204/287; 204/288; 204/289; 204/290 R; 219/75; 219/137 R; 219/145.21; 219/146.1; 219/146.21; 219/146.22
[58] Field of Search ................ 29/825; 204/224, 204/279, 280, 286, 287, 288, 289, 290, 293; 219/69.15, 75, 119, 120, 145.1, 145.21, 146.1, 146.2, 144.22

[56] References Cited

U.S. PATENT DOCUMENTS

| | | | |
|---|---|---|---|
| 2,604,441 | 7/1952 | Cushing | 204/82 |
| 2,967,142 | 1/1961 | Oliver | 204/288 |
| 3,389,072 | 6/1968 | Strandberg | 204/288 |
| 3,425,929 | 2/1969 | Emery et al. | |
| 3,746,827 | 7/1973 | Martin et al. | |
| 4,036,601 | 7/1977 | Weimar et al. | 428/663 |
| 4,074,718 | 2/1978 | Morrison, Jr. | 128/303.14 |
| 4,362,919 | 12/1982 | Miller et al. | |
| 4,920,946 | 5/1990 | Kuromatsu | |

Primary Examiner—Carl J. Arbes
Attorney, Agent, or Firm—James E. McGinness

[57] ABSTRACT

A welding electrode for providing a significant improvement in the detrimental tensile residual stress condition on the root side of welds, especially on the inside wall of piping welds. The electrode has a tungsten alloy blade. The blade is made from sheets of tungsten alloy by cutting or stamping. The preferred shape of the blade is an isosceles triangle. The base of the flat triangular blade is secured in a slot formed in an electrode holder. The electrode holder is preferably T-shaped, with the shank of the holder being connected to a conventional welding torch. The holder is made of electrically conductive material, whereby the blade is coupled to the torch for producing an electric arc at the blade tip for welding. The blade is optionally covered with a ceramic coating to prevent arcing to the side walls of the groove formed between the parts being welded. A further option is to incorporate insulating stand-offs which protrude from both flat sides of the electrode blade. These stand-offs serve to maintain a minimum gap between the side walls of the welding groove and the flat sides of the electrode blade, thus preventing the ceramic coating from being scratched off during electrode travel relative to the groove.

12 Claims, 5 Drawing Sheets

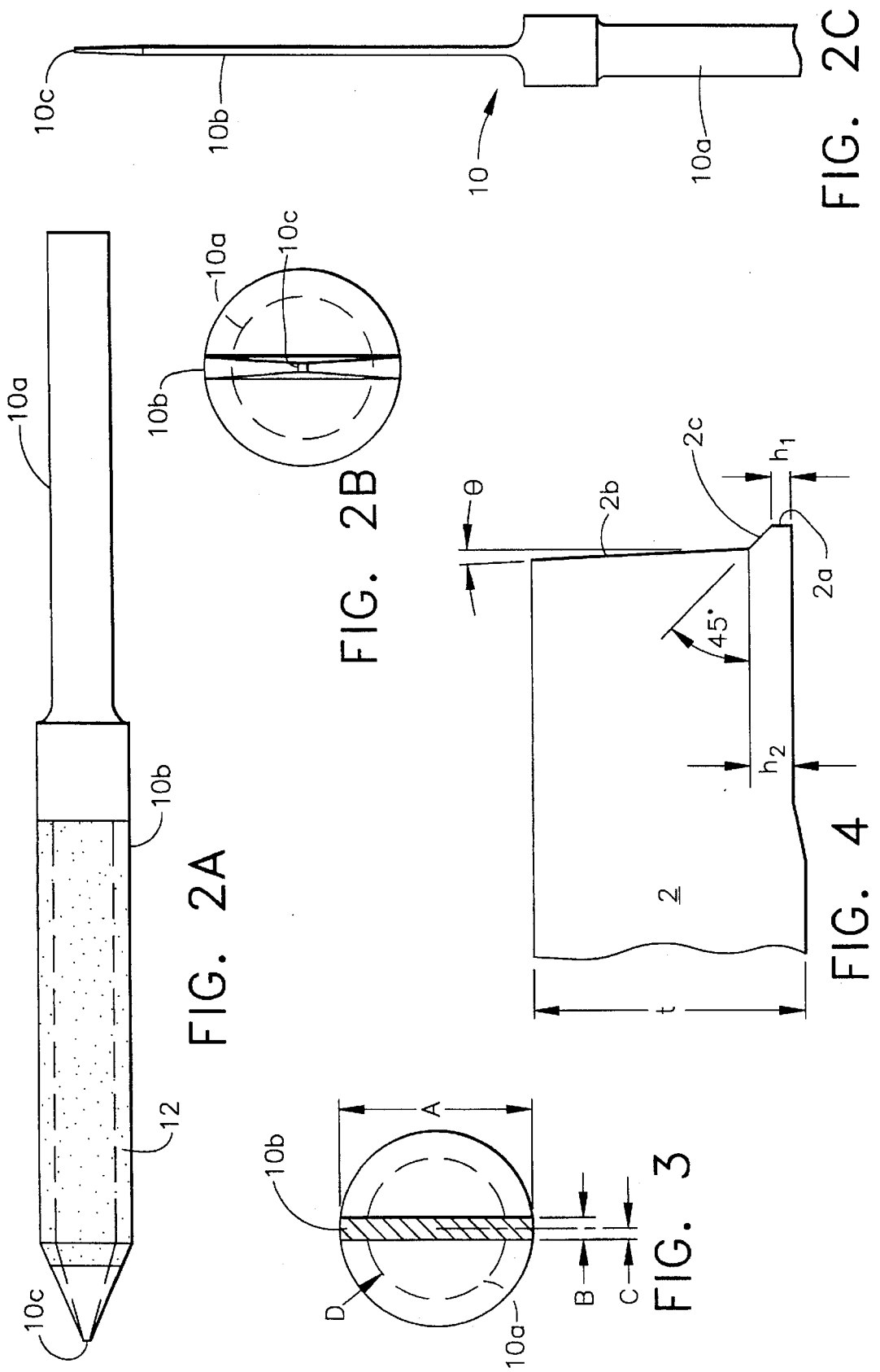

WELDING ELECTRODE WITH FLAT BLADE AND RELATED METHOD OF MANUFACTURE

RELATED PATENT APPLICATION

This application is a divisional application of U.S. patent application Ser. No. 08/237,732 filed on May 4, 1994 now U.S. Pat. No. 5,527,441.

FIELD OF THE INVENTION

This invention relates to the welding of piping and other residual stress-sensitive components. In particular, the invention relates to the welding of piping and other components used in nuclear reactors, which components are susceptible to stress corrosion cracking in the heat affected zones adjacent a weldment.

BACKGROUND OF THE INVENTION

A nuclear reactor comprises a core of fissionable fuel which generates heat during fission. The heat is removed from the fuel core by the reactor coolant, i.e. water, which is contained in a reactor pressure vessel. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions. As used herein, the term "high-temperature water" means water having a temperature of about 150° C. or greater, steam, or the condensate thereof.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope. Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC. The present invention is concerned with mitigating welding-induced residual stresses and thermal sensitization, which can lead to SCC in susceptible metals.

A conventional V-groove weld 6 for joining two pipes 2 and 4 is illustrated in FIG. 1A. The weld 6 is formed by filling the V-groove with beads of fused material from a filler wire placed at the tip of a circular cylindrical welding electrode (not shown). This welding process produces a very wide heat affected zone (HAZ) in the vicinity of the welded joint. The occurrence of SCC in the vicinity of such welded joints has led to the need for repair or replacement of much of the piping in light water reactor power plants throughout the world. Numerous methods have been utilized for over a decade to improve the tensile residual stress state in the vicinity of welded joints, including magnetic induction, electrical resistance and electric arc heating methods. All of these methods are based on generating a substantial temperature difference through the welded material thickness by applying the heat source on one side of the material and maintaining water cooling on the other side of the material. This temperature difference produces thermal strains and subsequent material plasticity, and a corresponding stress reversal across the thickness of the material. The net result makes the residual stress on the side of the joint exposed to the potentially aggressive reactor water environment significantly less tensile or, more preferably, compressive. These previous methods, including "heat sink welding" and "last pass heat sink welding", have all relied on continuous water convective cooling of the environmentally exposed side of the weld joint in order to effect the required temperature difference and stress reversal. This water cooling requirement is a severe penalty to the fabricator whether the piping is being newly installed or replaced, since the complete piping system must be intact in order to contain the water. The typically used arc welding process which requires water cooling to effect the temperature gradient through the material thickness and a corresponding residual stress reversal has relatively low thermal and time efficiencies and utilizes a wide weld joint design with a low aspect ratio of joint depth to thickness. The reduction of tensile forces residing in the metal lattice structure by internal water cooling during welding serves to mitigate the occurrence of irradiation-assisted SCC, wherein impurities in the stainless steel alloy diffuse to the grain boundaries in response to the impingement of neutrons.

A second major contributor to SCC in stainless steels alloyed with chromium for corrosion resistance is the size and degree of thermal sensitization of the heat affected zone adjacent to the weld. Thermal sensitization refers to the process whereby chromium carbides precipitate in the grain boundaries of the material. The precipitation of chromium carbides ties up the chromium which would otherwise be in solution. Thus, a thin layer along the grain boundary is denuded of chromium, creating a zone which is no longer corrosion resistant and therefore is susceptible to SCC. Such stainless steels corrode at the grain boundaries preferentially.

One consideration in the design of welds for SCC resistance is the minimization of the heat input by the process to the component being joined. This heat input is typically maintained at a level sufficient to provide reliable fusion by the weld filler metal to the side walls of the joint, which have in other welding processes been separated by an amount necessary to move a circular cylindrical electrode in the joint.

One type of reduced-groove-width welding process used commercially in power plant piping welds is so-called "narrow groove" welding, an illustration of which is given in FIG. 1B. This technique produces a weld 6' between pipes 2' and 4' which has a heat affected zone which is narrower than and a groove angle which is less than the HAZ and groove angle of the V-groove welding process. The "narrow groove" welding process uses a standard circular cylindrical electrode geometry. These standard electrodes come in various lengths and diameters, typically with a relatively pointed or conical end. However, in "narrow groove" welding, the reduction of the groove width has been limited by the minimum diameter of the electrode required to reliably carry the needed welding current. All previous welds, including "narrow groove" welds, have been made with the circular cylindrical electrode shape, which has become the industry standard. The minimum diameter of a circular cylindrical electrode is in turn limited by the electrical current-carrying and heat-dissipating capability of a given size. No provision has ever been made for the manufacture or installation of a noncylindrical electrode in either a V-groove or "narrow groove" weld application.

SUMMARY OF THE INVENTION

The present invention is a welding electrode for providing a significant improvement in the detrimental tensile residual stress condition on the root side of welds, especially on the inside wall of piping welds. The electrode has a replaceable tungsten alloy blade. The blade is made from sheets of tungsten alloy by cutting or stamping. The preferred shape of the blade is an isosceles triangle. Other shapes, such as a strip having a pointed end, can alternatively be used.

The base of the flat blade is secured in a slot formed in an electrode holder. The electrode holder is preferably T-shaped, with the shank of the holder being connected to a conventional welding torch. The holder is made of electrically conductive material, whereby the blade is coupled to the torch for producing an electric arc at the blade tip for welding.

The electrode blade is optionally covered with a ceramic coating to prevent arcing to the side walls of the groove formed between the parts being welded. In addition, insulating stand-offs may be optionally provided which protrude from both flat sides of the electrode blade. These stand-offs serve to maintain a minimum gap between the side walls of the welding groove and the flat sides of the electrode blade, thus preventing the ceramic coating from being scratched off during electrode travel relative to the groove.

During welding, the plane of the flat electrode blade is aligned parallel with the length of the weld joint. This combination enables joining of piping and other residual stress-sensitive components with both the initial weld joint preparation and the completed weld having a uniquely thin width and with a high aspect ratio of depth to width. Use of this high-aspect-ratio weld joint process substantially mitigates welding-induced residual stresses, without the normally required internal water cooling. The process is effective in mitigating residual stresses and the associated welding strains (distortion) in joints having any path shape, whether welded from one or more sides of the material. The welding process of the invention also reduces the heat input into the heat affected zones, thereby mitigating thermal sensitization of the welded joint.

BRIEF DESCRIPTION OF THE DRAWINGS

FIGS. 2A-2C are front, side and bottom views respectively of the electrode geometry in accordance with the present invention.

FIG. 3 a schematic showing the details of the blade geometry shown in FIG. 2C.

FIG. 4 is a sectional view of the groove geometry of a portion of a pipe to be joined in accordance with the welding technique of the present invention.

DETAILED DESCRIPTION OF THE PREFERRED EMBODIMENTS

Figure 1A:
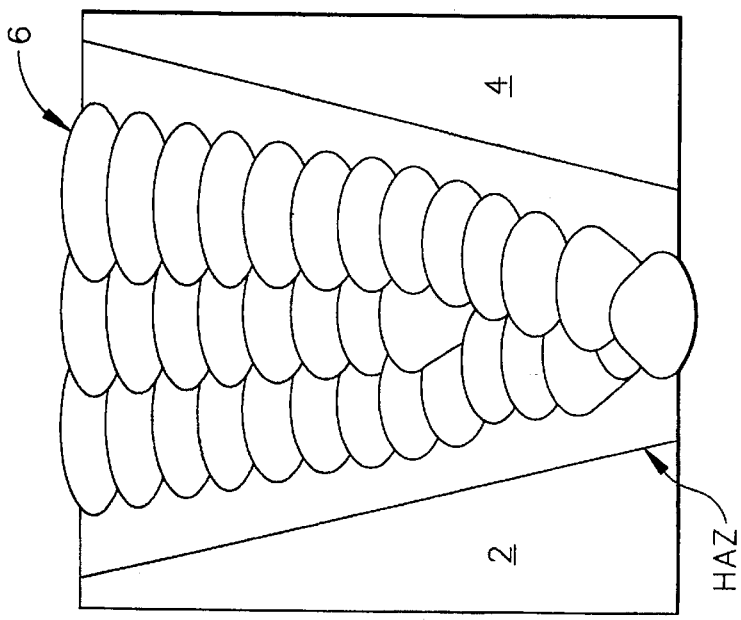
FIG. 1A is a sectional view of a V-groove joint welded in accordance with a conventional welding technique.
Figure 1B:
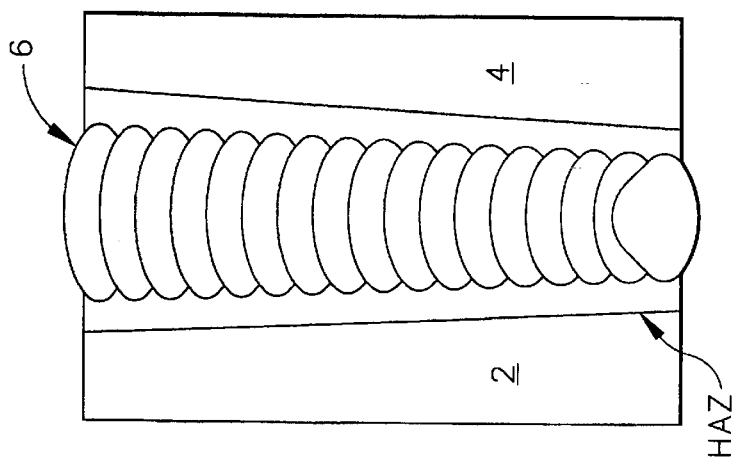
FIG. 1B is a sectional view of a narrow-groove joint welded in accordance with another conventional welding technique.

The welding equipment in accordance with the preferred embodiment of the invention comprises a conventional gas tungsten arc welding (GTAW) system with mechanized torch movement which is used in conjunction with a unique tungsten electrode geometry. The welding process in accordance with the invention comprises the step of creating a unique weld joint geometry, the welding of which is made possible by the novel electrode shape and made practical by other special features of this welding process. In accordance with the weld joint geometry of the invention, the groove between pipes 2 and 4 preferably has an acute angle less than 5° which is filled with weld material having a reduced width which requires less heat to achieve fusion. The result is a heat affected zone which in narrower than that produced by "narrow-groove" welding, as seen in a comparison between FIGS. 1B and 1C.

In contrast to conventional electrodes, an electrode in accordance with the present invention has a blade geometry wherein the blade cross section is non-circular. In particular, the blade cross section has an elongated dimension which is oriented parallel to the length of the weld joint and a shortened dimension which is oriented perpendicular to the length of the joint, e.g., a cylinder having a generally rectangular cross section. In accordance with the preferred embodiment of the present invention, the blade is cut or stamped from a flat sheet material, e.g., tungsten alloy sheet stock. The blade can be cut in the shape of a triangle (preferably isosceles) or a strip having parallel straight sides and a pointed tip at one end.

The thin electrode geometry of the invention provides an electrode having a dimension (i.e., the width) which is less than the diameter of a circular cylindrical electrode of equal cross-sectional area. This thinner dimension and its orientation enables the electrode of the present invention to enter thin grooves which a conventional circular cylindrical electrode is too wide to enter. Accordingly, the width of the joint to be welded can be made significantly smaller than is the case were a circular cylindrical electrode to be used. Further, the use of a noncylindrical, thin electrode in accordance with the present invention allows the weld heat input to be significantly reduced for each pass, and therefore the size and sensitization of the heat affected zone is correspondingly reduced.

From the standpoint of providing adequate mechanical strength of the welding electrode, the flat triangular blade is preferable because the base of the triangle which is clamped or otherwise held by the blade holder provides added resistance to bending. The flat blade of the invention can be inexpensively manufactured by cutting or stamping sheet material to form blades of any desired shape, e.g., triangles or strips. This flat construction also facilitates easy replacement of the electrode blade in the event it becomes damaged.

The elongated-cross section electrode used in the welding process of the invention is basically not limited in how thin it can be, and therefore how thin the weld joint can be, as long as there is clearance to the walls of the joint for forward travel.

In accordance with the concept of the invention, a flat tungsten alloy electrode has the geometry shown in FIGS. 2A–2C. Electrode 10 comprises a circular cylindrical shank 10$a$, a non-circular cylindrical blade 10$b$ and a tip 10$c$. Blade 10$b$ is optionally covered with an insulating coating. All sharp corners are radiused to prevent arcing. The cross section of blade 10$b$ preferably has the shape of a rectangle with rounded corners. The details of the blade dimensions are shown in FIG. 3. Blade 10$b$ has a width A, a thickness B and a half-thickness C, while the shank 10$a$ has a diameter D. The dashed lines visible in FIG. 2A indicate an alternate blade shape when A=D. The dimensions A through D (in inches) for five exemplary electrodes are given in the following table:

| Dimension | Type 1 | Type 2 | Type 3 | Type 4 | Type 5 |
| --- | --- | --- | --- | --- | --- |
| A | 0.125 | 0.125 | 0.1875 | 0.1875 | 0.250 |
| B | 0.060 ± 0.005 | 0.045 ± 0.005 | 0.045 ± 0.005 | 0.030 ± 0.004 | 0.025 ± 0.002 |
| C | 0.030 ± 0.002 | 0.0225 ± 0.002 | 0.0225 ± 0.002 | 0.015 ± 0.002 | 0.0125 ± 0.001 |
| D | 0.125 | 0.125 | 0.125 | 0.125 | 0.125 |

In accordance with the concept of the present invention, the dimensions A–D can be varied over wide ranges and are not restricted to the values set forth in the table. Preferably, the ratio A to B is at least 1.5:1.

A preferred embodiment of a groove geometry of a pipe 2 to be joined using the welding technique of the present invention is depicted in FIG. 4. The pipe has a wall thickness t. The end face of the pipe comprises a land 2$a$, which is an annular radial surface extending outward from the inner circumference of the pipe, and a beveled surface 2$b$, which is a conical surface extending radially outward at an angle θ relative to the radial plane. In accordance with the present invention, θ is preferably less than 5° and may be as small as 0°. An extension surface 2$c$ connects the outer periphery of land 2$a$ with the inner periphery of beveled surface 2$b$. Extension surface 2$c$ may be either a circular cylindrical surface (not shown) or a conical surface, e.g., having an angle of 45° as shown in FIG. 4. The height of land 2$a$ is designated by $h_1$; the height of extension 2$c$ is designated by $h_2$.

The welding technique of the present invention was successfully applied on 6- and 14-inch-diameter pipe made of Type 304 stainless steel in the horizontal position. The 6-inch-diam. pipe had a wall thickness t=0.432 inch; the 14-inch-diam. pipe had a wall thickness t=1.25 inches. For the purpose of test welding only, the bevel angle θ was selected to be equal to one of the following: 0°, 2°, 3+, 3.5° and 4°. The land height $h_1$ was varied from 0.030 to 0.070 inch; the extension height $h_2$ was varied from 0.090 to 0.156 inch.

Figure 5A:
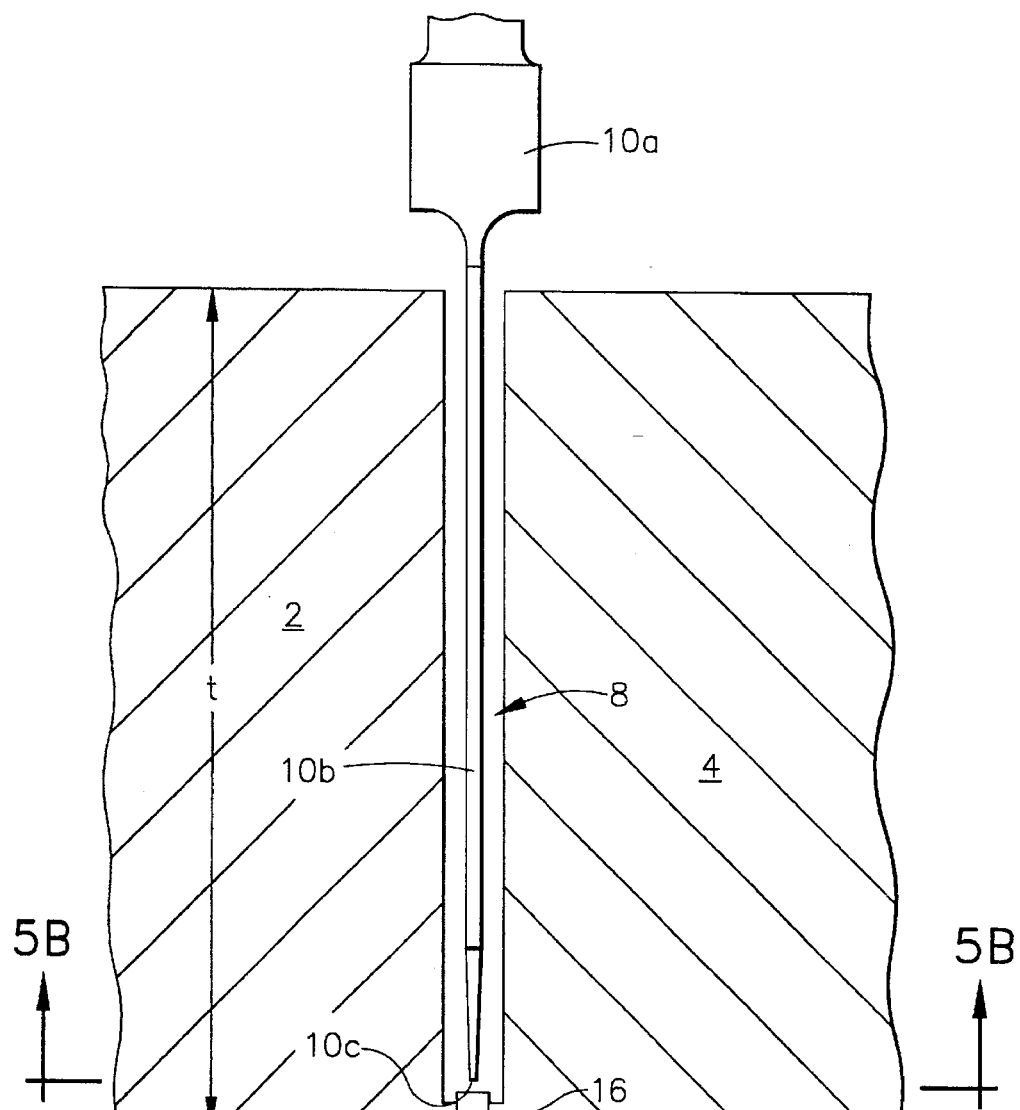
FIGS. 5A and 5B are side and top views respectively of a joint and welding equipment assembly in accordance with the present invention.
Figure 5B:
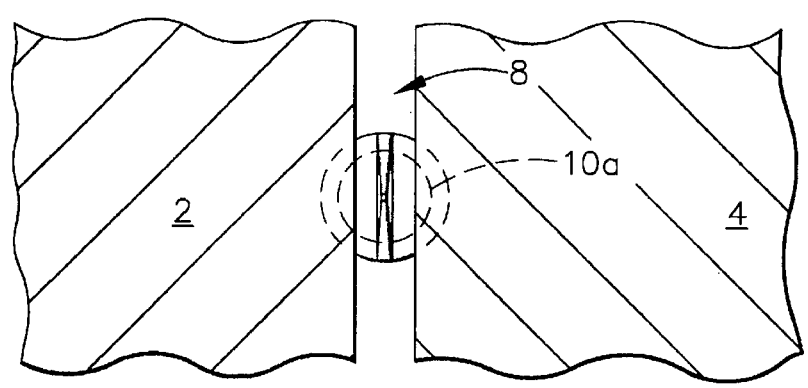

During welding, two pipes 2 and 4 are placed end to end in a horizontal position with a groove 8 therebetween, as depicted in FIGS. 5A and 5B. In this case, the groove 8 has parallel sidewalls, i.e., the bevel angle θ=0°. A consumable ring-shaped insert 16, having, e.g., a ⅟₁₆-inch×⅛-inch cross section and having the same composition as the filler wire, was placed between the lands of opposing pipe ends at the root of groove 8 to compensate for any radial mismatch of the lands. During the first (root) pass, the groove between pipes to be joined must be bridged. The lands and the consumable insert provide material which is fused together to form the weld root. After the root pass, a hot (second) pass is made, followed by a number of filler passes and a cover (last) pass.

Figure 1C:
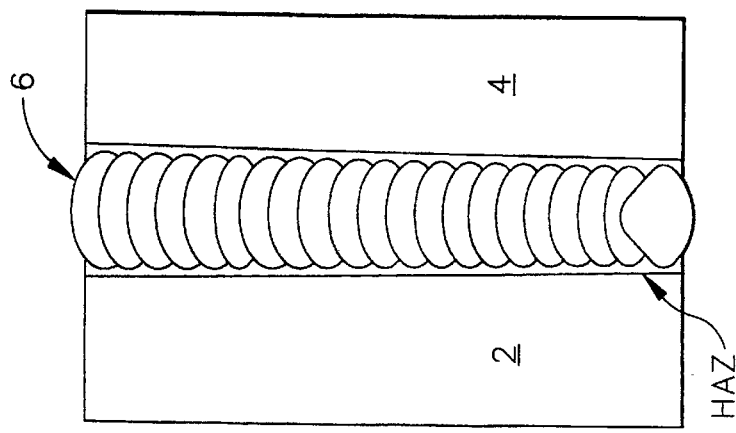
FIG. 1C is a sectional view of a joint welded in accordance with the technique of the present invention.

The weld beads are deposited inside the groove using a thin elongated tungsten alloy electrode 10 to melt the filler wire fed into the groove. Electrode 10 has the geometry shown in FIGS. 2A–2C and fits inside groove 8 with clearance between the electrode and the sidewalls as shown in FIG. 5B. Blade 10$b$ of electrode 10 is optionally covered with a ceramic coating 12 (see FIG. 5A) to prevent arcing to the side walls of groove 8. Suitable exemplary ceramic coatings include $Al_2O_3$ or $Y_2O_3$. The electrode is electrically coupled to a conventional welding torch (not shown in FIG. 5A). The flat electrode in conjunction with the small bevel angle and selected welding parameters produce a very thin weld joint, as shown in FIG. 1C.

Figure 6:
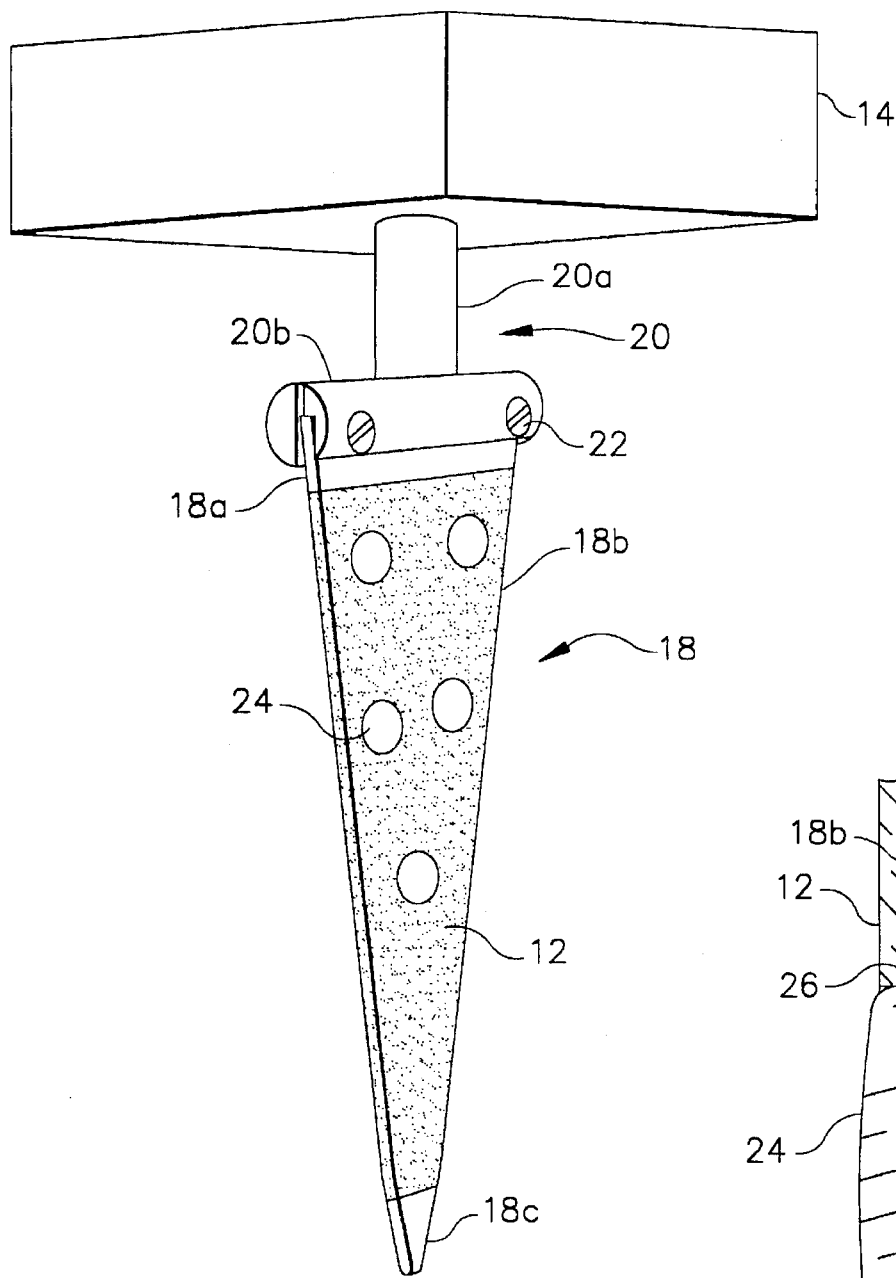
FIG. 6 is a perspective view showing the structure of an electrode having a flat triangular blade in accordance with a preferred embodiment of the invention.

The preferred embodiment in accordance with the invention is a flat tungsten alloy electrode having the geometry shown in FIG. 6. The electrode comprises a flat generally triangular blade 18 stamped or cut from tungsten alloy sheet. An exemplary thickness of the tungsten alloy sheet is 30 mils. The triangular shape allows a plurality of interleaved blades to be stamped or cut from a single sheet of tungsten alloy with very little wastage. Optionally the triangular shape of the blade may depart from being strictly isosceles by narrowing the tip 18$c$ at an increased rate.

As depicted in FIG. 6, blade 18 comprises a base 18$a$, a body 18$b$ and a tip 18$c$. The base 18$a$ is clamped or otherwise held by an electrode holder 20. Electrode holder 20 is preferably made of a conductive, oxidation-resistant material such as copper alloy (e.g., beryllium copper alloy), optionally electroplated with silver or nickel. The electrode holder preferably takes the form of a T-shaped metal body, comprising a shank 20$a$ and a crosspiece 20$b$. Shank 20$a$ is connected to a conventional welding torch 14. The crosspiece 20$b$ has a longitudinal slot shaped for receiving the blade base 18$a$ with sufficient play to allow easy insertion and removal. The blade base 18$a$ is held securely in the crosspiece slot by tightening a pair of set screws 22 in a corresponding pair of threaded holes formed in the crosspiece. The blade can be readily removed from the holder after the screws have been loosened. This allows easy replacement of a damaged electrode blade. Also interchangeable electrode blades having different dimensions can be selectively installed depending on the specific application. Alternatively, instead of using screws, the blade could be secured in the holder by brazing to create a monolithic blade assembly, i.e., the blade would not be readily replaceable.

The blade body 18$b$ is preferably covered with an insulating coating, e.g., $Al_2O_3$ or $Y_2O_3$, to prevent arcing to the welding groove sidewalls. Also, all rough edges on the stamped or cut blade are deburred to prevent arcing. In accordance with the preferred embodiment, the flat triangular blade incorporates one or more insulating stand-offs 24. Each insulating stand-off protrudes on both flat sides of the electrode blade beyond the plane of the blade surface. These stand-offs serve to maintain a minimum gap between the side walls of the welding groove and the flat sides of the electrode blade, thus preventing scratching or excessive wear of the ceramic coating during electrode travel in the welding groove. A sufficiently deep scratch on the coated surface of the blade will remove ceramic coating 12, leaving the blade susceptible to arcing along the uncoated locus.

Figure 7:
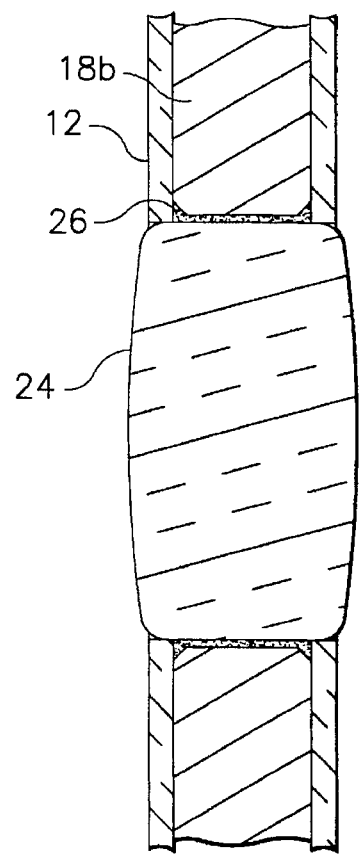
FIG. 7 is a sectional view of a portion of the flat triangular electrode blade of FIG. 6 showing the technique for mounting ceramic stand-offs in accordance with the invention.
Figure 8:
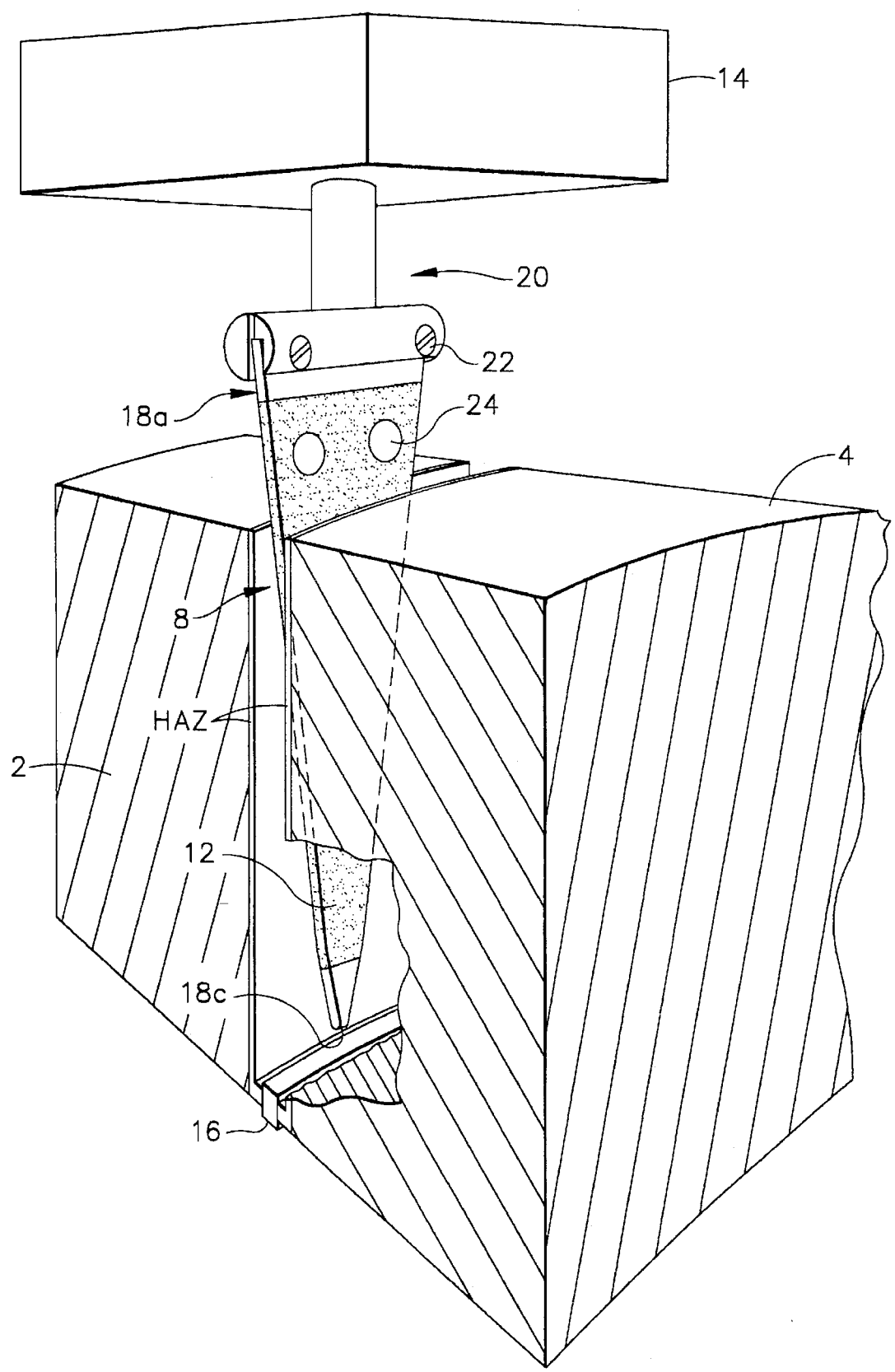
FIG. 8 is a schematic perspective view showing a joint and welding equipment assembly in accordance with the preferred embodiment of the present invention.

The construction of an exemplary electrode blade having a plurality of insulating stand-offs is shown in detail in FIG. 7. After the triangular-shaped blade has been cut or stamped from a tungsten alloy sheet, a plurality of circular holes are cut or stamped into the blade. Each stand-off 24 consists of a slug of insulating material, e.g., $Al_2O_3$ or $Y_2O_3$, having a circular cylindrical peripheral wall and a pair of slightly convex opposing surfaces. The diameter of the peripheral wall is slightly less than the diameter of the circular holes in the blade. Each stand-off 24 is secured in a corresponding hole by cement 26. Then an electrically insulating coating 12 is applied to the exposed surfaces of the blade body 18b, leaving the base 18a and tip 18c uncoated. Naturally, the height of the triangle must be greater than the depth of the welding groove by an amount that ensures uncoated base 18a is not close enough to a groove sidewall to cause arcing. The flat triangular electrode 18 of FIG. 6 is shown in FIG. 8 inserted inside a welding groove 8

The very thin weld joint which is made practical with the welding process using the elongated cross-section electrode of the present invention allows the two surfaces being joined to be in closer proximity to each other. As a result of this closeness, both surfaces are simultaneously wetted by a smaller molten weld pool with a significantly lower heat input rate (i.e., improved thermal efficiency) than is otherwise possible. This reduction in heat input per weld pass to the deposited filler material and base materials being welded allows the size and temperature of the heat affected zone (HAZ) adjacent to the fused zone to be significantly reduced, with the benefit of a corresponding reduction in SCC sensitivity of susceptible materials. As a result, the temperature gradient through the thickness of the component being welded is much steeper, since the gradient is controlled by the relatively constant high temperature of the molten metal, and the reduced low temperature of the far surface of the component (also known as the "root" or first pass of the weld). The steeper temperature gradient through the component which is achieved with the very thin weld joint of the invention also leads to the benefit of generating a less tensile or, preferably, a compressive residual stress state at the root of the weld. This improved stress state also leads to a reduction in SCC sensitivity of susceptible materials. The combined effects of the reduced thermal sensitization (i.e., carbide precipitation) in the heat affected zones and of the improved stress state at the root of the weld provide a significant increase in SCC resistance of a welded joint exposed to an aggressive environment.

The use of a welding gas with a lower electrical resistance in the ionized state in the welding process, such as a blend of argon and hydrogen and/or helium, rather than pure argon, allows the arc length (between the end of the electrode and the bottom of the weld joint) to be reduced, ensuring that the arc does not transfer to the walls of the joint which are closer to the electrode than is the case in other welding processes. An alternate method specified in the welding process to prevent the arc from transferring to the walls of the joint is to coat the surface of the electrode, except for the tip where the arc is intended to be transferred, with a material such as a ceramic having a greater resistance to ionize the welding gas blend. This provision helps to ensure that the edges (geometric discontinuities) of the electrode along its length are not arc transfer locations which are more favorable than the electrode tip. This method also eliminates the need to insert an electrically insulating gas cup extension into the joint, as is practiced in some other wider joint welding processes.

Another related benefit of the reduced heat input, size and temperature of the heat affected zone in accordance with the present invention is a reduction in or elimination of grain growth during welding. Significant grain growth in the heat affected zone and the corresponding thermal sensitization in this area leads to the "knife line attack" form of SCC in materials which are otherwise resistant to SCC, such as the stabilized grades of austenitic stainless steel.

The improved residual stress state at the root of a joint made by the welding process of the present invention, relative to the conventional joint welded with a wider groove and a circular cylindrical electrode, is generated by a stress reversal during the welding process. During the welding, the hot, weakened heat affected zone and recently solidified weld metal are plastically compressed due to their thermal expansion relative to the cooler and stronger surrounding material. Upon cooling, this compressed zone contracts against the surrounding material and is put in a state of tensile residual stress. The contraction and corresponding tensile stresses are balanced by the surrounding material, in particular the weld root, going to the desired state of less tensile or to a more desirable compressive stress. The degree of stress improvement depends on the particular welding process parameters used. A key factor in making the welding process effective in generating significantly reduced heat affected zone sensitization and root tensile residual stresses without water cooling (external heat sinking) of the component being welded is the very low heat input capability of the process (and corresponding internal heat sinking), made possible by the very thin joint geometry and in turn by the thin, non-circular welding electrode shape.

Another benefit of the reduction in the tensile residual stresses at the root of a joint made with the welding process in accordance with this invention is a decrease in the susceptibility of materials exposed in an irradiation environment to the mechanism of irradiation-assisted stress corrosion cracking (IASCC). This beneficial effect arises due to the retardation of diffusion of the detrimental elements to internal interfaces, which is assisted by the influence of higher tensile residual stresses.

Some of the welding process parameters which control the thermal efficiency of the process include the arc gas composition, the torch travel speed, and the arc current and current pulsing values. These and other parameters have been modified for the inventive welding process beyond their normal ranges for V-groove or "narrow-groove" welding in order to further the minimization of the heat affected zone and the root tensile residual stress. Measurements of the pipe diameter and axial length revealed that shrinkage was reduced, resulting in less tensile stress.

Different inert gas mixtures were tested as the shield gas, including: (1) 50% argon-50% helium; (2) 98% argon-2% hydrogen; and (3) 95% argon-5% hydrogen. The mixture of argon and hydrogen increases the temperature of the arc, causing the weld puddle to wet the substrate more quickly. Because of the high energy density, the skin of the substrate is heated quickly, leaving no time for the conduction of heat below the skin. This produces a thinner heat affected zone than is conventionally known. The addition of hydrogen also shortens the arc, so that less clearance to the side walls is needed.

Further, the torch travel speed during test welding was varied between 2 and 10 inch/min. The higher torch travel speeds allow the puddles of weld material to freeze quickly.

During development of the welding process, for the root (first) pass the arc current was 90 to 115 amps for the first pulse and 60 to 70 amps for the second pulse; for the hot (second) pass the arc current was 115 to 170 amps for the first pulse and 50 to 70 amps for the second pulse; for the fill passes the arc current was 170 to 220 amps for the first pulse and 70 to 110 amps for the second pulse. Various pulsing schemes were tried.

The foregoing process and apparatus have been disclosed for the purpose of illustration. Variations and modifications of the disclosed apparatus will be apparent to practitioners skilled in the art of welding. All such variations and modifications which do not depart from the concept of the present invention are intended to be encompassed by the claims set forth hereinafter.

I claim:

1. A method for manufacturing a welding electrode blade, comprising the step of cutting or stamping said blade from a flat sheet of electrically conductive material, said blade having a base at one end and a tip at an opposite end.

2. The method as defined in claim 1, wherein said flat sheet is made of tungsten alloy.

3. The method as defined in claim 1, wherein said flat blade has a generally triangular shape.

4. The method as defined in claim 1, wherein said flat blade is in the shape of a strip having parallel sides and a pointed end forming said tip.

5. The method as defined in claim 1, further comprising the step of coating a portion of said blade between said base and said tip with electrically insulating material.

6. The method as defined in claim 1, further comprising the steps of:

forming a through-hole in said blade;

forming a mass of electrically insulating material having opposing convex surfaces which are separated by a distance greater than a thickness of said blade and having an outer periphery which conforms to the shape of said through-hole; and securing said mass in said through-hole such that said convex surfaces protrude on opposite sides of said blade.

7. A method for manufacturing a welding electrode, comprising the steps of:

cutting or stamping a blade from a flat sheet of electrically conductive material, said blade having a base at one end and a tip at an opposite end;

forming a blade holder from electrically conductive material; and securing said base of said blade in said blade holder.

8. The method as defined in claim 7, wherein said flat sheet is made of tungsten alloy.

9. The method as defined in claim 7, wherein said flat blade has a generally triangular shape.

10. The method as defined in claim 7 wherein said flat blade is in the shape of a strip having parallel sides and a pointed end forming said tip.

11. The method as defined in claim 7, further comprising the step of coating a portion of said blade between said base and said tip with electrically insulating material.

12. The method as defined in claim 7, further comprising the steps of:

forming a through-hole in said blade;

forming a mass of electrically insulating material having opposing convex surfaces which are separated by a distance greater than a thickness of said blade and having an outer periphery which conforms to the shape of said through-hole; and securing said mass in said through-hole such that said convex surfaces protrude on opposite sides of said blade.

* * * * *